United States Patent
Hui et al.

(10) Patent No.: US 7,794,557 B2
(45) Date of Patent: Sep. 14, 2010

(54) TAPE CASTING METHOD AND TAPE CAST MATERIALS

(75) Inventors: Shiqiang Hui, Vancouver (CA); Yide Zhang, Storrs, CT (US); Danny Xiao, Willington, CT (US); Mingzhong Wu, Fort Collins, CO (US)

(73) Assignee: Inframat Corporation, Farmington, CT (US)

( * ) Notice: Subject to any disclaimer, the term of this patent is extended or adjusted under 35 U.S.C. 154(b) by 623 days.

(21) Appl. No.: 11/150,592

(22) Filed: Jun. 10, 2005

(65) Prior Publication Data

US 2006/0049540 A1   Mar. 9, 2006

Related U.S. Application Data

(60) Provisional application No. 60/580,249, filed on Jun. 15, 2004.

(51) Int. Cl.
    C03B 29/00    (2006.01)
    B28B 1/00     (2006.01)
    B28B 3/00     (2006.01)
    B28B 5/00     (2006.01)
    C04B 33/32    (2006.01)
    C04B 33/36    (2006.01)
    C04B 35/64    (2006.01)

(52) U.S. Cl. ............ 156/89.11; 264/621; 264/624; 264/625; 264/626; 264/650

(58) Field of Classification Search ........... 156/89.11; 264/621, 624, 625, 626, 650
See application file for complete search history.

(56) References Cited

U.S. PATENT DOCUMENTS

| | | | | |
|---|---|---|---|---|
| 3,330,697 A | | 7/1967 | Pechini | 117/215 |
| 3,965,552 A | * | 6/1976 | Rutt | 29/25.42 |
| 4,094,690 A | * | 6/1978 | Morton | 501/95.1 |
| 4,353,958 A | | 10/1982 | Kita et al. | 428/329 |
| 4,730,026 A | * | 3/1988 | Bolt et al. | 525/475 |
| 4,816,072 A | * | 3/1989 | Harley et al. | 106/287.18 |
| 4,966,742 A | * | 10/1990 | Khoury et al. | 264/166 |
| 5,024,883 A | * | 6/1991 | SinghDeo et al. | 428/323 |
| 5,084,423 A | * | 1/1992 | Vaahs et al. | 501/96.2 |
| 5,145,540 A | * | 9/1992 | Foley et al. | 156/89.17 |
| 5,230,729 A | | 7/1993 | McCandlish et al. | 75/351 |
| 5,279,994 A | | 1/1994 | Kerkar | 501/94 |

(Continued)

FOREIGN PATENT DOCUMENTS

JP   06-115946   *   4/1994

(Continued)

OTHER PUBLICATIONS

Inframat, "Description of Inframat Magnetic Nanocomposite Research", May 3, 2003 http://web.archive.org/web/20030503162640/http://inframat.com/magnetic.htm.*

(Continued)

*Primary Examiner*—Philip C Tucker
*Assistant Examiner*—Michael N Orlando
(74) *Attorney, Agent, or Firm*—Cantor Colburn LLP

(57) ABSTRACT

A precursor tape casting method is one in which chemical precursors are converted into a final chemical phase from green tapes to products. Because chemical precursors are employed rather than the final powder materials, sintering is not required to form the material. Lower annealing temperatures instead of high temperature sintering allow the formation of grains of about 1 to about 100 nanometers in the final material. In addition, when the final material is a magnetic/insulator composite, improved magnetic properties may be obtained.

20 Claims, 5 Drawing Sheets

U.S. PATENT DOCUMENTS

| | | | | |
|---|---|---|---|---|
| 5,386,006 | A | * | 1/1995 | Matsumoto et al. .......... 264/434 |
| 5,407,618 | A | * | 4/1995 | Stephenson ................. 264/623 |
| 5,437,825 | A | * | 8/1995 | Jensen ........................ 264/625 |
| 5,624,741 | A | * | 4/1997 | Scott ........................... 428/210 |
| 5,662,737 | A | * | 9/1997 | Chen ..................... 106/287.18 |
| 5,667,716 | A | | 9/1997 | Ziolo et al. ............... 252/62.52 |
| 5,709,783 | A | * | 1/1998 | Sanchez et al. .......... 156/89.12 |
| 5,868,884 | A | * | 2/1999 | Oiwa et al. ............... 156/89.16 |
| 5,914,151 | A | * | 6/1999 | Usuki ......................... 427/128 |
| 5,952,040 | A | | 9/1999 | Yadav et al. ............. 427/126.3 |
| 6,045,925 | A | | 4/2000 | Klabunde et al. ........... 428/548 |
| 6,048,920 | A | | 4/2000 | Ziolo et al. ................. 524/435 |
| 6,146,559 | A | * | 11/2000 | Zank .......................... 264/29.6 |
| 6,162,530 | A | | 12/2000 | Xiao et al. ............... 428/292.1 |
| 6,544,467 | B2 | * | 4/2003 | Symons et al. .............. 264/618 |
| 6,589,457 | B1 | * | 7/2003 | Li et al. ......................... 264/44 |
| 6,777,361 | B2 | * | 8/2004 | Aichele et al. ................. 501/88 |
| 6,814,903 | B1 | * | 11/2004 | Parker ........................... 264/13 |
| 6,858,174 | B2 | * | 2/2005 | Nair et al. .................... 264/669 |
| 7,163,650 | B2 | * | 1/2007 | Gegner ....................... 264/29.6 |
| 2001/0001285 | A1 | * | 5/2001 | Moh ........................... 428/343 |
| 2003/0151173 | A1 | * | 8/2003 | Wang et al. ................. 264/621 |
| 2004/0062911 | A1 | * | 4/2004 | Lauf et al. .................. 428/138 |
| 2004/0255721 | A1 | * | 12/2004 | Lewis et al. .................... 75/345 |
| 2006/0167147 | A1 | * | 7/2006 | Asgari ......................... 524/174 |
| 2007/0178232 | A1 | * | 8/2007 | Kodas et al. ................ 427/180 |

FOREIGN PATENT DOCUMENTS

| | | | |
|---|---|---|---|
| JP | 2000-124085 | * | 4/2000 |
| WO | WO 03/035279 | * | 5/2003 |

OTHER PUBLICATIONS

H. Gleiter et al., "Materials With Ultrafine Microstructures: Retrospectives and Prespectives", NanoStructured Materials, vol. 1, 1992, pp. 1-19.

Y.D. Zhang et al., "Nanocomposite Co/SiO2 Soft Magnetic Materials", IEEE Transactions On Magnetics, vol. 37, No. 4, Jul. 2001, pp. 2275-2277.

A. Chatterjee et al., "Glass-metal Nanocomposite Synthesis by Metal Organic Route", J. Phys. D: Appl. Phys. 22 (1989) 1386-1392.

G. Herzer, "Soft Magnetic Nanocrystalline Materials", Scripta Metallurgica et Materialia, vol. 33, Nos. 10/11, 1995, pp. 1741-1756.

C. Djega-Mariadassou et al., "High Field Magnetic Study of Small Fe Particles Dispersed in an Alumina Matrix", IEEE Transactions on Magnetics, vol. 26, No. 5, Sep. 1990, pp. 1819-1921.

M. Pardavi-Horvath, "Magnetic Properties of Copper-Magnetite Nanocomposites Prepared by Ball Milling", J. Appl. Phys. 73 (10), May 15, 1993, pp. 6958-6960.

D.E. Nickles et al., "Protection Of Fe Pigments With Amine-Quinone Polymers", IEEE Transactions of Magnetics, vol. 30, No. 6, Nov. 1994, pp. 4068-4070.

D.L. Leslie-Peleck et al.y, "Self-stabilized Magnetic Colloids: Ultrafine Co Particles In Polymers", J. Appl. Phys. 79 (8), Apr. 15, 1996, pp. 5312-5314.

J. Wang et al., "Preparation and Magnetic Properties of Fe100-xNix-SiO2 Granular Alloy Solid Using A Sol-Gel Method", Journal of Magnetism and Megnetic Materials 135 (1994), pp. L251-L256.

J.I. Gittleman et al. "Superparamagnetism and Relaxation Effects in Granular Ni-SiO2 and Ni-Al2O3 films", Physical Review B, vol. 9, No. 9, May 1, 1974, pp. 3891-3897.

J.L. Gittleman et al., "Magnetic Properties of Granular Nickel Films", Physical Review B, vol. 5, No. 9, May 1, 1972, pp. 3609-3621.

E. Paparazzo et al., "X-ray Photoemission Study of Fe-Al2O3 Granular Thin Films", Physical Review B, vol. 28, No. 2, Jul. 15, 1983, pp. 1154-1157.

A. Gavrin et al., "Fabrication and Megnatic Properties of Granular Alloys", J. Appl. Phys. 67 (2), Jan. 15, 1990, pp. 938-942.

G.A. Niklasson et al., "Optical Properties and Solar Selectivity of Coevaporated Co-Al2O3 Composite Films", J. Appl. Phys. 55 (9), May 1, 1984; pp. 3382-3410.

M. Pardavi-Horvath et al., "Switching Field Distribution Changes During Reaction-Milling of Iron-Zinc Nanocomposites", IEEE Transactions on Magnetics, vol. 31, No. 6, Nov. 1995, pp. 3775-3777.

C. Laurent et al., "Magnetic Properties of Granular Co-polymer Thin Films", J. Appl. Phys. 65 (5), Mar. 1, 1989, pp. 2017-2020.

D.N. Lambeth et al., "Media for 10 Gb/in.2 Hard Disk Storage: Issues and Status (invited)", J. Appl. Phys. 79 (8), Apr. 15, 1996, pp. 4496-4501.

H. Fujimori, "Structure and 100MHz Soft Magnetic Properties in Multilayers and Granular Thin Films", Scripta Metallurgica et Materialia, vol. 33, Nos. 10/11, 1995, pp. 1625-1636.

G.T. Rado, "Magnetic Spectra of Ferrites", Reviews of Modern Physics, vol. 25, No. 1, Jan. 1953, pp. 81-89.

G.T. Rado, "On the Inertia of Oscillating Ferromagnetic Domain Walls", Physical Review, vol. 83, No. 4, Aug. 15, 1951, pp. 821-826.

W.D. Jones, Fundamental Principles of Powder Metallurgy, Edward Arnold (Publishers) LED, London, p. 659.

K.H. Kim et al., "The Magnetic Properties of Nanocrystalline Fe-Co(Cr)-Hf-N Thin Films", Journal of Applied Physics, vol. 87, No. 9, May 1, 2000, pp. 5248-5250.

A. Goldman, Handbook of Modern Ferromagnetic Materials, Kluwer Academic Publishers.

R.D. Shull et al., "Nanocomposite Magnetic Materials", Journal of Nanostructured Materials (1992).

G.C. Hadjipanayis et al., Science and Technology of Nanostructured Magnetic Materials, Plenum Press, New York, 1991.

T.D. Xiao et al., "Microstructural Characteristics of Chemically Processed Manganese Oxide Nanofibres", Acta mater, vol. 45, No. 4, 1997, pp. 1685-1693.

P. Luo et al., "Synthesis of Chromium Silicide-Silicon Carbide Composite Powders", Materials Science and Engineering, B17(1993) pp. 126-130.

T.D. Xiao et al., "Synthesis of Aluminum Nitride/Boron Nitride Composite Materials", J. Am. Ceram. Soc. 76 [4] (1993) pp. 1987-1992.

T.D. Xiao et al., "Synthesis of Nanostructured Ni/Cr and Ni-Cr3C2 Powders by an Organic Solution Reaction Method", NanoStructured Materials, vol. 7, No. 8, 1996, pp. 857-871.

T.D. Xiao et al., "Synthesis of Si(N,C) Nanostructured Powders From an Organometallic Aerosol Using a Hot-wall Reactor" Journal of Materials Science 28 (1993) pp. 1334-1340.

P.R. Strutt et al., "Synthesis of Polymerized Preceramic Nanoparticle Powders by Laser Irradiation of Metalorganic Precursors", NanoStructured Materials, vol. 1, 1992, pp. 21-25.

T.D. Xiao et al., "Synthesis of FeXn/Bn Magnetic Nanocomposite Via Chemical Processing", NanoStructured Materials, vol. 2, 1993, pp. 285-294.

J.P. Partridge et al., "Laser-assisted Chemical and Morphological Modification of Metallic Substrates", SPIE vol. 669 Laser Applications in Chemistry (1986), pp. 150-160.

M.L. Lau et al. "Synthesis of Nanocrystalline M50 Steel Powders by Cryomilling", NanoStructured Materials, vol. 7, No. 8, 1996, pp. 847-856.

C.G. Granqvist et al., "Ultrafine Metal Particles", Journal of Applied Physics, vol. 47, No. 5, May 1976, pp. 2200-2219.

J. Smit et al., FERRITES, Philips' Technical Library (Holland) 1959.

Y. Hayakawa et al., "High Resistive Nanocrystalline Fe-M-O (M=Hf, Zr, rare earth metals) Soft Magnetic Films for High-Frequency Application (invited)", J. Appl. Phys. 81 (8), Apr. 15, 1997, pp. 3747-3752.

D.L. Leslie-Pelecky et al., "Magnetic Properties of Nanostructured Materials", Chem. Mater.: 1996, 8, pp. 1770-1783.

A.K. Giri et al., "Coercivity of Fe-SiO2 Nanocomposite Materials Prepared by Ball Milling", J. Appl. Phys. 76 (10), Nov. 15, 1994, pp. 6573-6575.

Tape Casting: Past, Present, Potential, [online]; [retrieved on Aug. 25, 2008]; retrieved from the internet, http://www.ceramicbulletin.org/months/Oct98/cast.html.

* cited by examiner

TAPE CASTING METHOD AND TAPE CAST MATERIALS

CROSS REFERENCE TO RELATED APPLICATION

This application claims the benefit of U.S. Provisional Patent Application Ser. No. 60/580,249 filed Jun. 15, 2004, which is incorporated herein by reference in its entirety.

STATEMENT REGARDING FEDERALLY SPONSORED RESEARCH

The United States Government has certain rights in this invention pursuant to National Science Foundation Grant No. DMI 0216929, National Aeronautics and Space Administration Contract No. NAS 3 00073, and Air Force Contract No. F29601-02-C-0031.

BACKGROUND

Tape casting is a technique, which can be used, for example, for the manufacture of flat, large area ceramic components. Tape cast products are found in a wide variety of industries, such as microelectronics, photovoltaic solar applications, laminated composites, rapid prototyping, and the like. The tapes can be cast with thicknesses ranging from a few microns to a few hundred microns. For most applications, it is crucial that the control of green tape thickness is precise, and that these thickness values are consistently reproducible.

Current tape casting techniques involve the dispersion of a powdered material (i.e., comprising the final phase) into a solvent, and the addition of dispersants and other casting ingredients to form a homogeneous slurry. Ball milling is typically used to form a homogeneous suspension. The slurry is cast into tapes by, for example, casting the slurry onto a moving carrier surface, such as mylar or cellophane, and spreading the slurry to a controlled thickness with the edge of a blade. Casting is followed by drying of the tape to evaporate solvent, and final sintering of the tape at elevated temperatures (e.g., at temperatures of about 650° C. to over 1500° C.) to form either thick film type or bulk form ceramic components.

Nanostructured components play increasingly more important roles in many areas such as magnetic materials, catalysts, fuel cells, filters, electrodes for batteries, chemical sensors, and gas separators. Available techniques for fabrication of nanostructured components include chemical routes such as spin or dip coating, spray pyrolysis, and chemical vapor deposition; and physical routes such as severe plastic deformation, physical vapor deposition, and thermal plasma spray. However, existing tape casting methods are not suitable for production of nanostructured components because of the high temperatures required for sintering of the green tape. There thus remains a need for improved tape casting methods, particularly those that allow the production of nanostructured tapes.

SUMMARY

A method of tape casting a material comprises casting one or more chemical precursors to form a green tape; and heating the green tape for a time and at a temperature sufficient to convert the chemical precursors to their final chemical phase and to anneal and form the material.

A method of tape casting a magnetic composite comprises casting a magnetic component chemical precursor and an insulting material chemical precursor to form a green tape, and heating the green tape for a time and at a temperature sufficient to convert the magnetic component chemical precursor and the insulating material chemical precursor to their final chemical phase and to anneal and form the magnetic composite, wherein each magnetic particle of the magnetic composite is surrounded by an insulating layer, and wherein the magnetic particles have grain sizes of about 1 to about 100 nanometers.

In another embodiment, a tape cast material comprises grain sizes of about 1 nanometer to about 100 nanometers.

BRIEF DESCRIPTION OF THE DRAWINGS

Referring now to the Figures, which are exemplary embodiments, and wherein the like elements are numbered alike.

DETAILED DESCRIPTION

Figure 1:
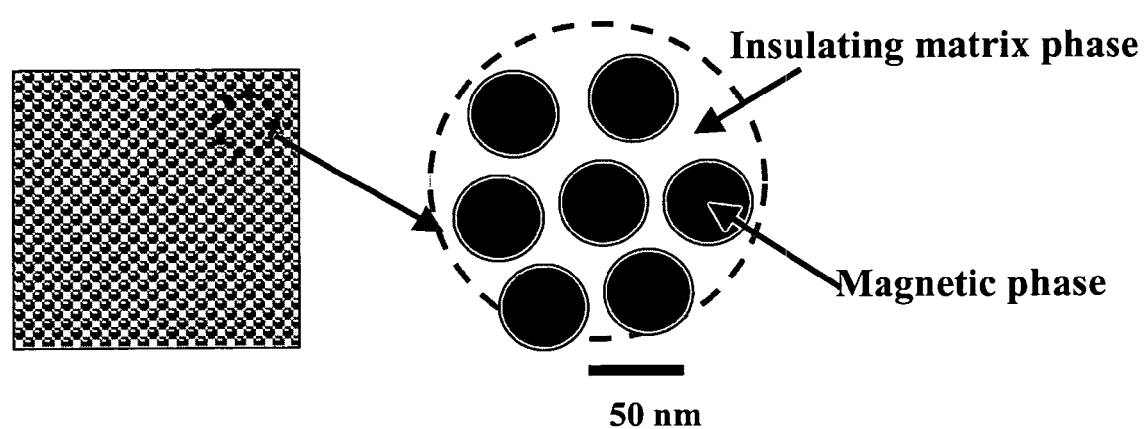
FIG. 1 is a schematic representation of a magnetic/insulator composite.

As used herein, the terms "first," "second," "bottom," "top," and the like do not denote any order or importance, but rather are used to distinguish one element from another; and the terms "the", "a" and "an" do not denote a limitation of quantity, but rather denote the presence of at least one of the referenced item. Furthermore, all ranges reciting the same quantity or physical property are inclusive of the recited endpoints and independently combinable. The modifier "about" used in connection with a quantity is inclusive of the stated value and has the meaning dictated by the context or includes at least the degree of error associated with measurement of the particular quantity.

In contrast to conventional tape casting, the disclosed method is precursor tape casting, a method in which materials synthesis and consolidation and/or annealing are combined in one process. Instead of using metal or ceramic powders that comprise the final chemical phase of the material, precursor tape casting employs one or more chemical precursors which are converted into the final chemical phase of the materials during consolidation and/or annealing at a temperature below the sintering temperature of the material. The chemical precursors are provided as a solution, suspension, or powder, for example. Similar to conventional tape casting techniques, the process proceeds by casting of a green tape, followed by heating. Heating is employed to remove solvent and/or binder and to convert the chemical precursors to their final chemical phase. Heating is also used to convert the tape to its final microstructure. Thus, unlike conventional tape casting, in precursor tape casting, heating (e.g., consolidation and/or annealing) is combined with synthesis of the final chemical phase of the material. Prior to heating, the green tape can be shaped such that a shaped material is formed. Also, several green tapes can be laminated to produce a final material having the desired thickness. If desired, laminating followed by shaping may be performed.

In conventional tape casting, high temperature sintering of the green tapes is generally a grain growth process in which the grains grow to micrometer (μm) sizes. Because the material is cast in its final chemical phase, high temperature sintering is required to coalesce the grains and form the final tape. Even if the materials in the green tape start at nanometer sizes, sintering leads to grain growth to micrometer size grains in the final material. In precursor tape casting, in contrast, chemical precursors of the final phase are converted to their final chemical phase during heating of the green tape (i.e., consolidation and/or annealing at a temperature below the sintering temperature of the material). Use of chemical precursors allows the conversion of the chemical precursors into desired phases through nucleation (i.e., a self-assembly process), formation of nanoparticles from nuclei formed, and heating (e.g., annealing) of the nanoparticles to form the final materials. Because the material is formed at an atomic level during nucleation, annealing may be performed at a temperature lower than the sintering temperature for the material. Sintering is not required and is specifically avoided to reduce grain growth. According to the sintering theory, grain growth is a temperature-dependent process. Because sintering is not performed in precursor tape casting, grain growth does not occur to the extent that it does during sintering in conventional tape casting. Therefore, the grain sizes formed by the precursor tape casting process (e.g., nanometer-sized grains) are much smaller than the grain sizes in the conventional tape casting process (e.g., micrometer-sized grains). The decreased grain sizes result in increased surface area of the grains that accelerates the diffusion or chemical reaction during consolidation and/or annealing. Thus, the precursor tape casting method may be employed to form nanostructured materials.

A nanostructured material comprises nanometer sized grains (e.g., about 1 to about 100 nanometers) which are about $10^9$ times smaller (i.e., 100-fold in each dimension) than the volume of a grain of traditional bulk materials. With this extremely small building block, the material may have a more uniform mechanical structure. This structure offers suitable strength, ductility and hardness, and improved resistance to fracture, deformation, wear and corrosion. The mechanical properties of the material may be dependent on the uniformity of the nanostructure. In the case of magnetic materials, the improved structural properties do not conflict, and in many cases are even consistent, with improved magnetic and electric properties of the material. Therefore, materials formed by the novel precursor tape casting method may have the desired nanostructure leading to improved physical properties.

The precursor tape casting method comprises casting one or more chemical precursors of a material to form a green tape, and heating the green tape for a time and a temperature sufficient to convert the chemical precursors to their final chemical phase and to anneal the material. The chemical precursors may be in the form of a solution, suspension, gel, or powder which may further comprise binders or other additives. The solution, suspension, or gel may be aqueous or non-aqueous. Tape casting may be performed, for example, on conventional tape casting equipment which may comprise a scraping blade (i.e., a "doctor blade"), a slurry reservoir, and a movable surface. The green tape is heated to convert the chemical precursors to their final phase and to anneal the tape. Heating is performed at a temperature below the sintering temperature for the material. The heating may be performed at about 300° C. to about 900° C., preferably about 350° C. to about 700° C. The material formed by the methods is preferably a nanostructured material.

The method may be used to make a variety of materials including metals, ceramic materials, ceramic/metal composites, metal/metal composites, organic/inorganic hybrid materials, magnetic materials, and combinations comprising one or more of the foregoing materials. The materials may be in the form of, for example, laminated layers which may be consolidated into a final form such as, for example, a toroid. The materials may be dense or porous depending on the material requirements, materials employed, slurry composition, and annealing conditions. Tape cast components may be made in unsupported form and may have thicknesses of up to about 500 micrometers, for example.

The chemical precursors may be in the form of, for example, metal alkoxides in organic solvents, inorganic salts in aqueous solution, or combination comprising one or more of the foregoing precursors. Specific examples include carboxylate salts, acetate salts, nitrate salts, chloride salts, alkoxide salts, butoxide salts, and the like, and combinations comprising one or more of the foregoing salts; with alkali elements, alkaline earth metals, transition metals, rare earth metals, and the like, and combinations comprising one or more of the foregoing elements and metals, as well as combinations of the foregoing salts, elements and metals. Precursors may also be in the form of metal-organic compounds such as, for example, tetraethoxysilane (TEOS), tetramethoxysilane (TMOS), and the like, and combinations comprising one or more of the foregoing inorganic silanes. In the case of complex compounds such as magnetic/insulator composites, the reagents may be weighed according to the desired stoichiometry of the final compound, i.e., according to the desired stoichiometry of the magnetic nanocomposite oxide, and then mixed into a liquid medium. The precursor solution may be heated and stirred to dissolve the solid components and homogenize the solution. Alternatively, or in addition to salts, a chemical precursor may be in the form of an intermediate complex, i.e., a chemical complex which may be more complex than a salt, but is not the chemical phase of the final material. Such intermediate complexes may be formed as products of hydrolysis, for example, when a precursor solution or suspension is dried to form a powder prior to casting. There may be limited reaction of or between the precursors during drying. The final chemical form of the materials, however, is not achieved prior to applying heat (i.e., consolidation and/or annealing).

The chemical precursor solution/suspension preferably comprises binder. Suitable binders include, for example, water compatible binders, or binders suitable for use with organic solvents such as, for example, polyvinylbutyrol.

A chemical precursor solution/suspension may be formed, for example, by mixing a liquid medium, binders, and the chemical precursors in amounts appropriate for the formation of the final material. The liquid medium may be an aqueous or non-aqueous solvent such as, for example, water, alcohols, acetone, methyl ethyl ketone, and combinations comprising one or more of the foregoing liquid media. A precursor solution/suspension may be made by a wet chemistry process, such as sol-gel, the Pechini method, and citrate method. The sol-gel method is a versatile process for making materials with high purity and high homogeneity while employing low temperatures. In general, the sol-gel process involves the transition of a system from a liquid "sol" (i.e., mostly colloidal) into a solid "gel" phase. The Pechini (U.S. Pat. No.

3,330,697 to Pechini) is a low temperature process for making materials based on the formation of resin intermediates front the polymerization of inorganic or metal organic precursors. The resin intermediate generally contains metal atoms bonded through oxygen to organic radicals comprising the cross-linked network of reacted precursors. Ignition of the resin intermediates; removes the organic material and leaves the desired product composition. The citrate method involves the chemical reduction of metal salts by citric acid or another salt containing a citrate ion to form a colloidal gel.

The chemical precursor mixture may be dried to form agglomerates, which may optionally be ground into a pre-composite powder. The precomposite powder is mixed with a binder (e.g., BD75-716, available from Ferro Electronic Materials) and an optional surface modifier solution (e.g., mixing solution M1194, available from Ferro Electronic Materials), an optional defoaming solution (e.g., M1195, available from Ferro Electronic Materials), and optional wetting solution (e.g., M1196, available from Ferro Electronic Materials), to form the chemical precursor solution/suspension. The amount of precursor powder in the chemical precursor solution/suspension is about 30 percent by volume (vol %) to about 60 vol %, or about 35 vol % to about 45 vol % of the total volume of the chemical precursor solution/suspension. The amount of optional surface modifier solution in the chemical precursor solution/suspension is about 0 vol % to about 5 vol %, or about 0 vol % to about 2 vol % of the total volume of the chemical precursor solution/suspension. The amount of binder in the chemical precursor solution/suspension is about 20 vol % to about 50 vol %, or about 25 vol % to about 35 vol % of the total volume of the chemical precursor solution/suspension. The chemical precursor solution/suspension is mixed or may optionally be ball milled to promote mixing.

The chemical precursor solution/suspension is then cast using a tape caster. The as-cast green tape may have a thickness of about 20 μm to about 200 μm, or about 50 μm to about 100 μm. Heating may be performed in one step or in multiple steps. After casting, the green tape may optionally be dried at a temperature of about 25° C. to about 50° C., for example. After drying, the green tape may be cut or otherwise processed. Multiple layers may be stacked and laminated together at a temperature of about 50° C. to about 80° C., such as about 70° C. The green tape or laminated layers may then be cut into the desired shape and size prior to consolidation. The laminated green tape may be gently dried at temperature of about 80° C. over a period of about three days in order to prepare a dense component. Without being held to theory, it is believed that during consolidation, the nanostructure is formed in the material and impurities are removed from the material. The heating rate is preferably either slow or quick enough to ensure substantially homogeneous evaporation and nucleation of the final chemical phase of the material. The dry green tape is then annealed in a furnace with controlled atmosphere for annealing. Annealing is performed at a temperature below that which sintering of the material begins. Annealing may take place at a temperature of about 300° C. to about 900° C., or about 300° C. to about 700° C. for a time of about 1 hour to about 10 hours.

The precursor tape casting method is a versatile method for production of different types materials. An exemplary material for formation by the precursor tape casting method is a metal/insulator nanostructured composite material that comprises nanostructured magnetic particles embedded in an insulating material. Specifically, magnetic particles with maximum dimensions of about 1 to about 100 nm are embedded in an insulating component such that the magnetic particle-particle separation is about 0.5 nm to about 100 nm (see FIG. 1). In part because nanostructured materials are constructed of nanometer-sized building Hocks, which are on the order of 1000 times smaller in each dimension than the volume of traditional bulk materials, replacing commercially used ferrite cores with these high performance magnetic nanostructured composites may result in inductive components that are lighter, smaller, economical, and highly durable, contributing greatly to improved performance in high frequency devices, as well as in microwave antenna and rectenna applications. The materials furthermore may have a more uniform mechanical structure, with high strength, ductility and hardness, and larger resistance to fracture, deformation, wear, and corrosion.

Suitable soft magnetic materials include but are not limited, having a magnetic component, for example transition metals such as Fe, Co, Ni, Mn, and Zn; transition metal intermetallic alloys such as Fe—Ni, Fe—Co, Co—NI, Fe—B, Fe—Si—B, Fe—Zr—B, Fe—P—B, Mn—Zn, and Ni—Zn, and transition metal-rare earth alloys, such as Fe—Nb, Fe—Sm, and the like, and combinations comprising one or more of the foregoing magnetic materials. Suitable insulating phase materials are high dielectric materials, including, amorphous or crystalline ceramics such as alumina, silica, zirconia, and the like, high dielectric polymers and polymer composites, and combinations comprising one or more of the foregoing insulating phase materials. By high dielectric, it is meant that the materials have a dielectric constant of greater than or equal to about 5. The insulating phase components can be either nonmagnetic or magnetic (such as ferrite) materials, as well as combinations comprising one or more of the foregoing materials.

In the precursor tape casting method, low temperature annealing is performed rather than high temperature sintering which allows the formation of nanostructured products. The low temperature annealing, which retains the nanostructure, is based on two simultaneous processes, e.g., phase formation and consolidation. The desired phases are formed during annealing instead of from the starting materials as in conventional tape casting. In the case of magnetic materials, the formation of the magnetic phase at relatively low temperatures (e.g., less than or equal to about 400° C.) favors small grain sizes (e.g., less than or equal to about 20 nm). The formation of magnetic materials from precursors is a homogeneous nucleation process that gives substantially uniformly-sized nuclei granules. In addition, a narrow grain size distribution may result, possibly from self-assembly during consolidation and/or annealing. The desired final phases are formed and annealed at the same time to form the final material. The annealing process can be performed under ordinary laboratory conditions, safely, and at low cost. In addition, strain and stress, which are detrimental to magnetic properties, can be minimized during annealing. A coated core/shell magnetic material/insulating material structure, for example, may be retained in the consolidated nanocomposite cores, which may be damaged by pressure-based annealing approaches.

Conventional tape casting temperatures usually go beyond 1000° C. However, precursor tape casting of magnetic materials may be performed at temperatures of about 350° C. to about 700° C. With such low temperatures, e.g., 700° C., core densities for a magnetic composite such as a $Ni_3Fe/SiO_2$ (80:20) nanocomposite can reach a 95% theoretical density.

Preferred composites for formation by the precursor tape casting method include, for example, Fe—Ni/silica, Co/silica, Fe/silica, Ni-ferrite, and Fe—Co/silica for magnetic applications. Other suitable composites include $(FeCo)_{1-x}(Al_2O_3)_x$ where x is greater than zero and less than or equal to about 0.50. The new method can be also used to where large surface areas or small grains are required such as in thick films and bulk materials for magnetic devices, energy conversion (fuel cell), energy storage devices, gas separators and filters (e.g., hydrogen and/or oxygen separation membranes), sensors, and catalysis.

The magnetic/insulating nanostructured composites are suitable for use in many fields where soft magnetic materials are currently used. In particular, the following soft magnetic materials application categories are especially desirable: (i) power applications, for example high power applications such as power transformers, pulse transformers, filters, and chocks, as well as low power applications such as inductors and linear transformers; (ii) linear applications, (iii) microwave applications, such as antenna, rectenna, circular; (iii) magnetic fluids; and (iv) refrigeration applications.

Magnetic nanocomposite precursor tape cast films may be employed, for example, in DC-DC converters. Such converters may be used in the about 400 kHz to about 1 MHz frequency range, or in the greater than about 1 MHz frequency range. At less than about 1 MHz, the magnetic components may be in a core shape and the transformer may be formed by copper wire winding. At greater than about 1 MHz, the magnetic components may be in a plate shape, and an integrated planar transformer may be assembled.

Fuel cells are devices that convert chemical energy directly into electrical energy by placing a pair of electrodes in mutual contact through an intervening electrolyte, feeding a fuel to one of the electrodes and an oxidant to the other electrode, and carrying out oxidation of the fuel electrochemically within the cell. There are several types of fuel cells, depending on the electrolyte used. Precursor tape casting can be used to fabricate fuel cells, including electrolytes, electrodes, and interconnects, particularly for solid oxide fuel cells (SOFC).

Energy storage devices, such as batteries and supercapacitors, require electrodes comprising an active material for energy storage, conversion, and/or release.

Precursor tape casting can be applied, for example, to the fabrication of ceramic membranes, which can be used for gas separation and gas absorption. Gas separation membranes rely on a difference in physical or chemical interaction between components present in a as mixture and the membrane material, causing one component to permeate faster through the membrane than another. The gas component dissolves into the membrane material and diffuses through it to the other side. The membrane divides the feed gas stream in two streams—the permeate stream and the retentate stream. The quality of the separation is determined by the selectivity and by two process parameters: the ratio of the permeate flow to the feed flow; and the ratio of permeate pressure to the feed pressure.

Gas absorption membranes are membranes which are used as contacting devices between a gas flow and a liquid flow. The separation is caused by the presence of an absorption liquid on one side of the membrane which selectively removes certain components from a gas stream on the other side of the membrane. In contrast with gas separation membranes, it is not essential that the membrane has any selectivity at all. It is merely intended to provide a contacting area without mixing gas and absorption liquid flow.

An advantage of employing precursor tape casting to form components for the above described applications is that tape casting may be employed to form porous or dense materials (e.g., a porosity less than about 10%) as needed for a particular application.

The disclosure is further illustrated by the following non-limiting examples.

Example 1

Tape Casting Fabrication of Fe—Ni/Silica Thick Films

Figure 2:
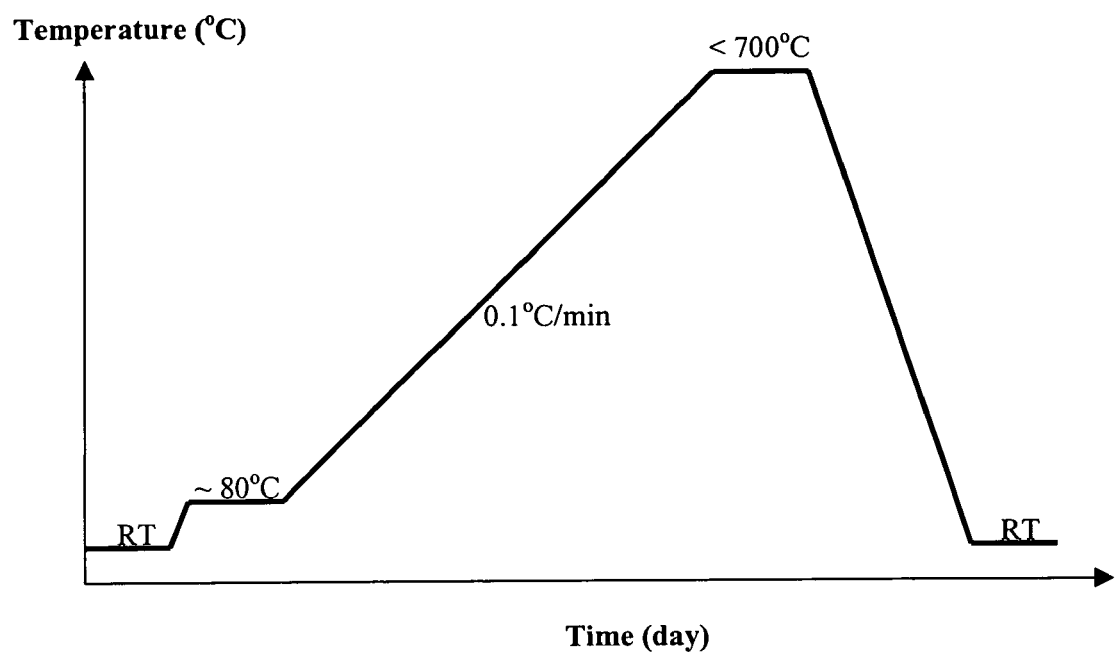
FIG. 2 shows an exemplary heating cycle for as-cast tapes.

The raw materials for nickel, iron, and silica were nickel nitrate, iron nitrate, and tetraethoxysilane (TEOS), respectively. The raw materials were mixed in ethanol, stirred and heated to 60° C. until gelation occurred. The ethanol was then removed by evaporation at about 80° C. A further drying process was performed in an oven at about 100° C. for about 12 hours to obtain porous agglomerates. The agglomerates were ground to form a fine precomposite powder. The precomposite powder was mixed with modifier M74001 in alcohol solution, and then added with binder B1201 (polyvinylbutyrol) supplied from Ferro Electronic Materials. The ratio of precomposite powder, modifier, and binder was optimized to be about 35:35:30 percent by volume. The mixture was then ball milled for about 12 hours to form a slurry. The slurry was cast into a tape with dimensions 6 inches wide, about 4 feet long, and about 200 µm thick through a lab-scale tape caster. The tape was then dried on the tape-caster carrier for about 3 hours in air. The dried tape was cut into about 4.2×5 cm² segments to fit the die. Four single layers were pressed together at about 70° C. to laminate them. The laminated tapes were cut into a toroidal core with an outside diameter of about 15 mm and an inside diameter of about 8 mm. The toroidal cores were dried for three days with gently increased temperatures from about 25° C. to about 80° C. in an oven. The cores were then annealed in a furnace in flowing hydrogen at a temperature of about 400° C. to about 700° C. The heating rate was restricted to about 0.1° C./min to ensure the homogeneous evaporation and nucleation. FIG. 2 shows an exemplary annealing heating cycle for the formation of cast tapes.

Figure 3:
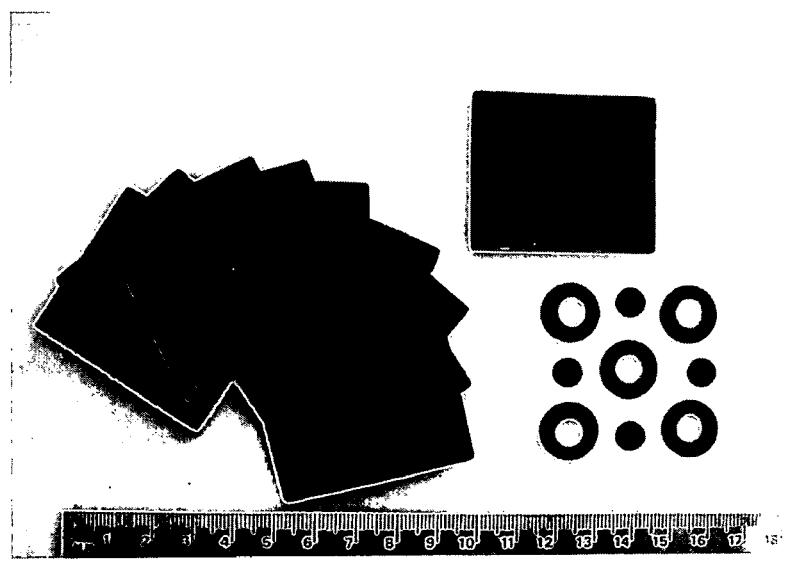
FIG. 3 is a photograph of products from precursor tape casting at different stages.
Figure 4:
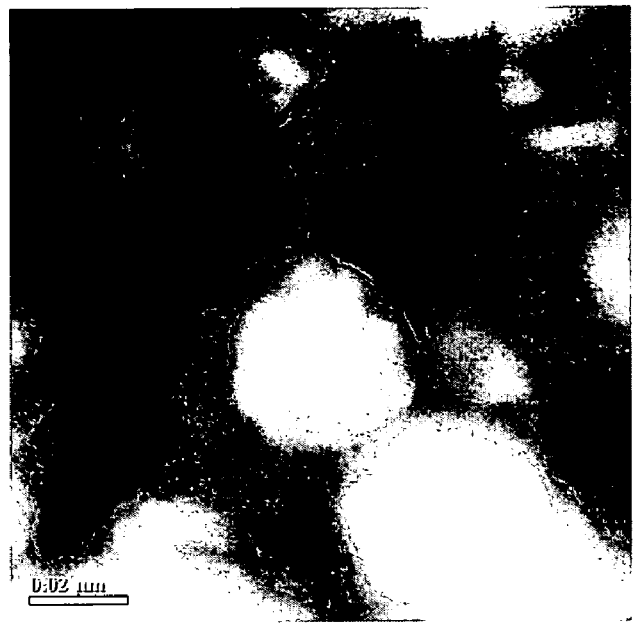
FIG. 4 is a TEM image of annealed tapes, indicating the formation of nanostructured grains (the scale bar is 20 nm)
Figure 5:
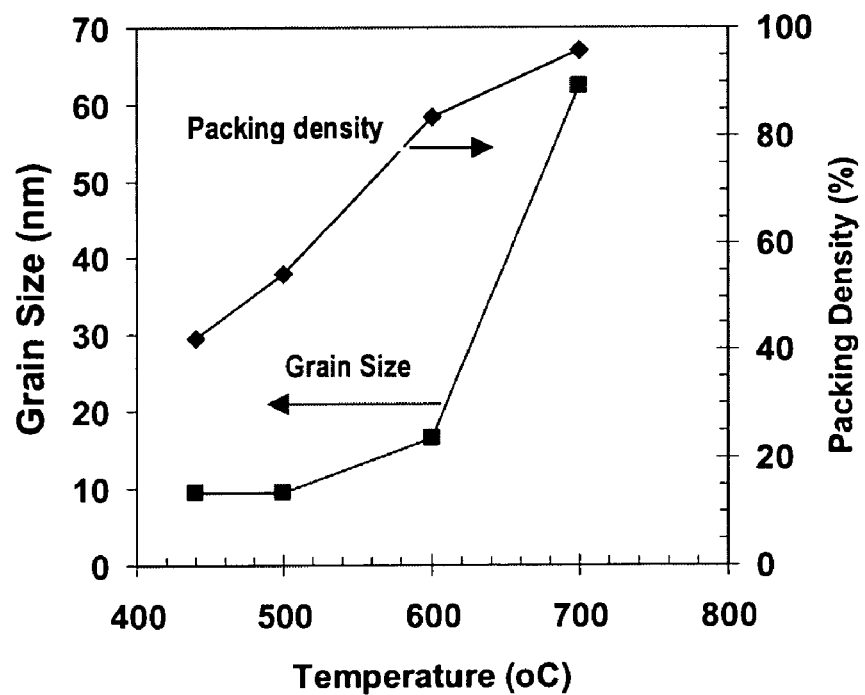
FIG. 5 is a plot of grain size and packing density as a function of annealing temperature for a Ni—Fe/$SiO_2$ nanocomposite.

Because phase formation and consolidation occur simultaneously in the precursor tape casting method, a consolidated material comprising nanostructure was produced. The products at different stages for the precursor tape casting are shown in FIG. 3, including green tapes, laminated tapes, and shaped and annealed cores. FIG. 4 clearly shows the nanometer sized grains in the material that was formed. FIG. 5 shows packing density and Fe—Ni grain size plots as a function of temperature. FIG. 5 reveals that at temperatures below about 600° C., core packing densities remained less than about 60%, while the grain size remained at about 10 nm average. At heating temperature of about 600° C., the packing density went up to about 83%, with a grain size of less than about 25 nm. TEM images clearly show nanometer-sized grains in the materials formed (not shown).

Figure 6:
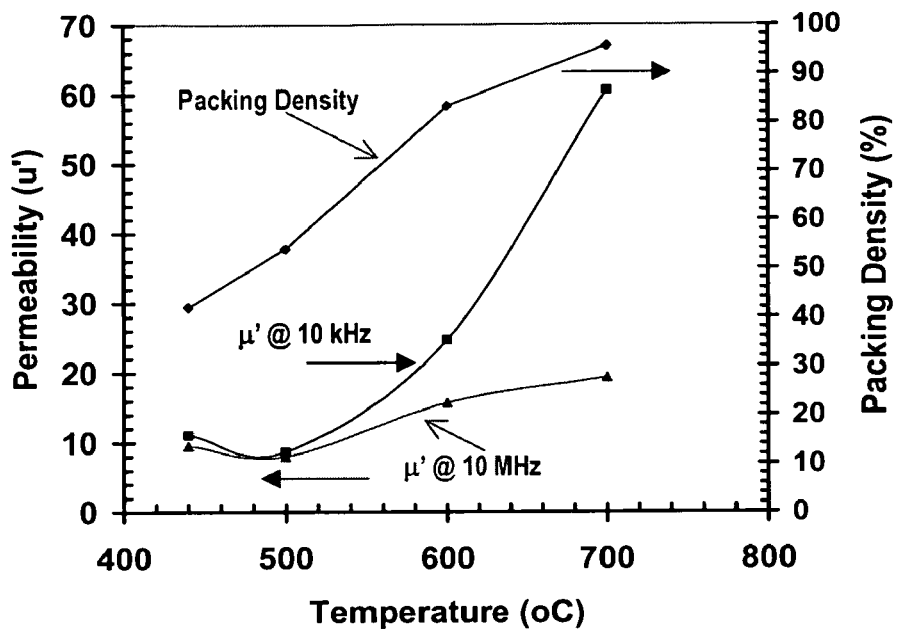
FIG. 6 is a plot showing the permeability and packing density as a function of annealing temperature for a Ni—Fe/$SiO_2$ nanocomposite.

The magnetic properties of the tape cast composites are related to the conditions used to form the composites including the consolidation temperature. FIG. 6 shows the core packing density and magnetic permeability for the magnetic composites. When the core packing density was below 80% and the core casting temperature was about 400 to about 500° C., the initial permeability remained at a value of about 10 for both about 10 kHz and about 10 MHz frequency measurements. However, when the material packing density went up to about 83%, permeabilities of about 25 at about 10 kHz and about 16 at about 10 MHz were obtained. When the packing density went up to about 95%, a permeability of about 60 was obtained at about 10 kHz, and about 19 at about 10 MHz. Thus, the packing density increases with increasing temperature as does the permeability. The desired permability for a particular material depends on the particular material and the particular frequency. While the desired permeability is material and frequency-dependent, in this system the measured permeabilities are suitable.

Figure 7:
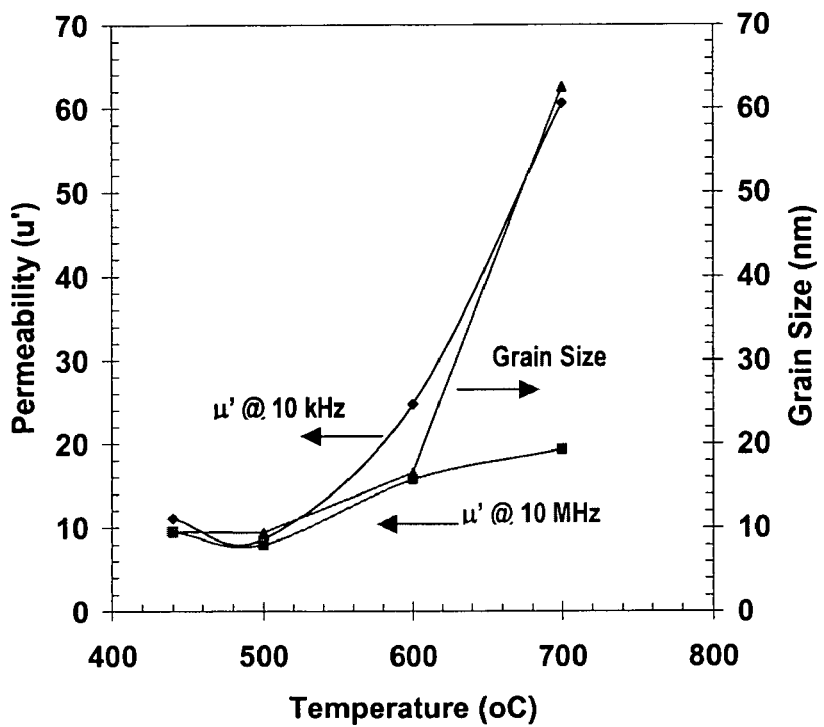
FIG. 7 is a plot showing the permeability and grain size as a function of annealing temperature for a Ni—Fe/$SiO_2$ nanocomposite.

FIG. 7 shows the plot of permeability and grain size as a function of tape casting temperature. It demonstrates at a temperature of about 600° C., good material permeabilities at both about 10 kHz and about 10 MHz were obtained, while the grain size remained less than about 20 nm. At this annealing temperature, some fraction of the nanoparticles is likely to experience exchange coupling leading to significantly increased permeability. Exchange coupling is a quantum phenomena, which takes place between neighboring nanoparticles. When nanoparticles are far apart, they can not interact with each other, thus there is no exchange coupling. When there is no exchange coupling, there are poor magnetic properties, e.g., low permeability. When the particles are in a dense packed form, neighboring nanoparticles may interact or be exchange coupled, leading to good magnetic properties, especially at elevated frequencies.

Example 2

Tape Casting Fabrication of Co/Silica Thick Films

The raw materials for cobalt and silica were cobalt acetate and tetraethoxysilane (TEOS), respectively. A toroidal core was formed using the method as in Example 1.

Example 3

Tape Casting Fabrication of Fe/Silica Thick Films

Figure 8:
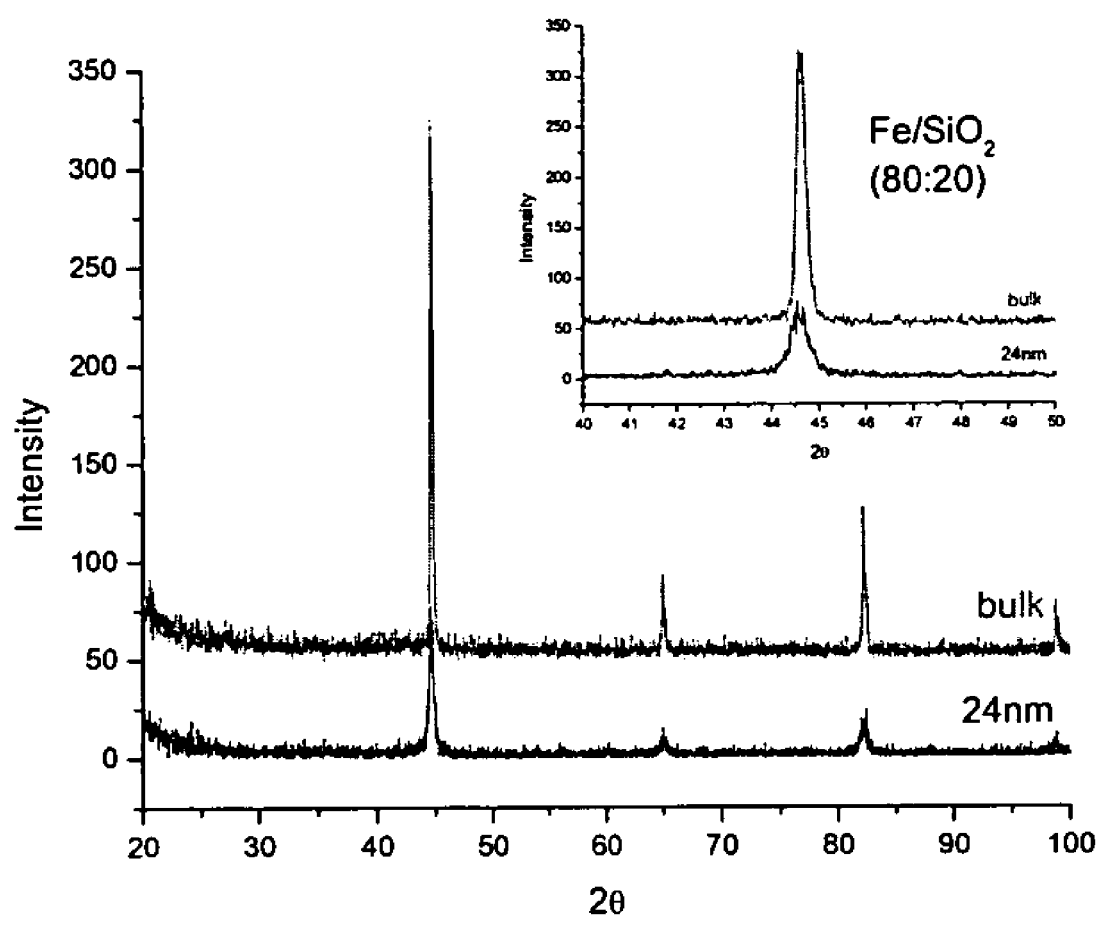
FIG. 8 shows the XRD spectra for a Fe/$SiO2$ (80:20 in vol) composite.

The raw materials for iron and silica are iron nitrate and tetraethoxysilane (TEOS), respectively. A toroidal core was formed using the method as in Example 1. Powder X-ray diffraction indicated that phase pure Fe/silica was obtained as shown in FIG. 8. Grain size was estimated to be about 24 nm from X-ray diffraction peak broadening using peak breadth at full width half maximum (FWHM) and the Scherrer equation derived from Bragg's Law.

Example 4

Tape Casting Fabrication of Ni-Ferrite ($NiFe_2O_4$) Thick Films

The raw materials for nickel and iron are nickel nitrate and iron nitrate, respectively. A toroidal core was formed using the method as in Example 1.

Example 5

Tape Casting Fabrication of Fe—Co/Silica Thick Films

The raw materials for iron, cobalt, and silica are iron nitrate, cobalt acetate, and tetraethoxysilane (TEOS), respectively. A toroidal core was formed using the method as in Example 1.

Experiments with different conditions were carried out for a composition having the formula $(FeCo)_{0.8}/(Al_2O_3)_{0.2}$. The first slurry batch was tape cast to about 220 μm thick. The characterized physical properties are summarized in Table 1. The grain size remained about 30 nm when the annealing temperature was less than or equal to about 650° C. However, the permeability was low and appeared constant as a function of frequency and annealing temperature. Visual examination of the consolidated magnetic cores revealed a hollow or bubble structure under these annealing conditions. The porous structure of the magnetic core may have contributed to the poor permeability. The bubble structure was also found on consolidated tapes of single layer tapes, indicating that the nucleation was not uniform. New tapes were prepared with homogeneous distribution of precursors through fully degassing of the slurry. Due to trapped air in the casting slurry, air bubbles may be formed in the cast tape. Degassing of the slurry may be employed to reduce the appearance of bubbles and to create a more homogeneous appearance in the tapes.

TABLE 1

Physical properties of consolidated n-$(FeCo)_{0.8}/(Al_2O_3)_{0.2}$ composites via tape casting

| Temperature (° C.) | Permeability | Saturation Magnetization (G) | Grain Size (nm) |
| --- | --- | --- | --- |
| 480 | 11.4 at 1 kHz | 18392 | 31 |
| 525 | | 18005 | 34 |
| 550 | | 18392 | 32 |
| 650 | 10.7 at 1 kHz | 19941 | 43 |
| 700 | | 20328 | 72 |

Example 6

Alternate Tape Casting Fabrication of Fe—Co/Silica Thick Films

The raw materials for iron, cobalt, and silica were iron nitrate, cobalt acetate, and tetraethoxysilane TEOS), respectively. A toroidal core was formed using the method as in Example 1.

In order to improve the consolidation conditions for the cast-tape, slurry preparation may be one of the key steps. Since the precursors of an n-$(FeCo)_v/(Al_2O_3)_{1-v}$ composite have higher solubility in water than that in alcohol, the organic system used in first batch was replaced by an aqueous system. For this purpose, water-based binder systems from Ferro Electronic Materials were employed. Upon the successful synthesis of a precomposite powder as described above, the precomposite powder was mixed with modifier M1194 (aqueous surfactant) in water, and then added with binder BD75-716 supplied from Ferro. The ratio of precomposite powder, modifier, and binder was optimized to be about 72:1:27 by weight. The mixture was then ball milled for about 12 hours. The composition of the n-$(FeCo)_n/(Al_2O_3)_{1-n}$ composite was also extended from $(FeCo)_{0.8}/(Al_2O_3)_{0.2}$ to $(FeCo)_{0.9}/Al_2O_3)_{0.1}$, $(FeCo)_{0.95}/(Al_2O_3)_{0.05}$, and FeCo.

The green tapes for the compositions of $(FeCo)_{0.95}/(Al_2O_3)_{0.05}$ and FeCo were laminated without any significant difficulty. However, $(FeCo)_{0.9}/(Al_2O_3)_{0.1}$ tapes were difficult to press together, even at temperature as high as about 80° C. The laminated tapes were shaped into toroidal cores and annealed at different temperatures and heating rates. The morphology of toroidal core had much more smooth surface than the previous example, indicating a significant improvement of the composition homogeneity. The physical properties of the annealed cores are summarized in Table 2. The packing density increased as the amount of $Al_2O_3$ increased in the n-$(FeCo)_v/(Al_2O_3)_{1-v}$ composite at about 420° C. The alumina might function as a sintering aid. However, this trend was not observed for annealed tapes at other temperatures. The packing density also increased as a function of annealing temperature, likely due to enhanced diffusion at higher temperature. The permeability increased as the packing density increased. Higher temperatures may be necessary to increase the packing density therefore to improve the permeability.

The initial permeability and saturation magnetization data are summarized in Table 2. For $(FeCo)_{0.8}/(Al_2O_3)_{0.2}$, $(FeCo)_{0.9}/(Al_2O_3)_{0.1}$, $(FeCo)_{0.95}/(Al_2O_3)_{0.05}$, and FeCo, their theoretical saturation magnetization values are about 19360 G, 21780 G, 23000 G and 24200 G, respectively. As shown in Table 2, after annealing at a relatively low temperature (less than about 500° C.), the samples with these compositions possessed saturation magnetization values exceeding about 90% of their corresponding theoretical values. This is an advantage of precursor tape casting. The highest permeability obtained for these materials was about 550 as shown in Table 2. Although the packing density is still low (about 79%) for this sample, a large increase in permeability may occur after the material is further densified.

Static magnetization curves and hysteresis loops for $(FeCo)_{0.8}/(Al_2O_3)_{0.2}$, $(FeCo)_{0.95}/(Al_2O_3)_{0.05}$, and FeCo, respectively, were generated (data not shown). The coercivity was determined to be about 150 Oe for $(FeCo)_{0.8}/(Al_2O_3)_{0.2}$, and 3.5 Oe for $(FeCo)_{0.95}/(Al_2O_3)_{0.05}$. For pure FeCo, the coercivity is less than about 3 Oe. A common feature shown of these materials was the very large linear magnetization range for these samples. The magnetization process is nearly linear up to over about 70% saturation. These characteristics originate from the nanostructure of these samples. This feature is very useful for high power applications, such as materials for electromagnetic aircraft launch system (EMAILS).

tional tape casting requires sintering to form the final phase, while in precursor tape casting heating is performed at a temperature below the sintering temperature of the material.

There are also differences in the materials produced by the two methods. In conventional tape casting, nanostructured materials may be employed in slurry formation. However, after high temperature sintering, the resulting material will typically not have nanostructure. Thus, a significant change in the microstructure is expected upon high temperature sintering. In precursor tape casting, in contrast, the use of precursor solutions allows for low temperature annealing. An advantage of low temperature annealing is that nanostructured materials may be produced during the annealing process. Yet another difference between conventional and precursor tape casting is that to form a porous material in conventional tape casting, a fugitive material is required to create porosity. Because of the low temperature annealing in precursor tape casting, the binder may function as a fugitive material thus obviating the need for an additional fugitive material.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this

TABLE 2

Physical properties of consolidated n-FeCo/Al$_2$O$_3$ composites via tape casting with improved processing conditions

| Composition | Annealing Conditions | ID # | Initial Permeability | Saturation Magnetization | Packing Density |
|---|---|---|---|---|---|
| $(FeCo)_{0.9}/(Al_2O_3)_{0.1}$ | 420° C. 3 h | 0227031 | 16.9 at 1 kHz | 20255 | 76% |
| $(FeCo)_{0.95}/(Al_2O_3)_{0.05}$ | 420° C. 3 h | 0227032 | 15.6 at 1 kHz | 19771 | 64% |
| | 700° C. 1 h | 0307032 | 31.9 at 1 kHz | 23000 | 70% |
| | 900° C. 1 h | 0314032 | 79 at 5 kHz | | 70% |
| | 900° C. 5 h | 0329032 | | | |
| FeCo | 420° C. 3 h | 0227033 | 24.2 at 1 kHz | 22022 | 50% |
| | 700° C. 1 h | 0307033 | 51.2 at 1 kHz | 24200 | 76% |
| | 900° C. 1 h | 0314033 | 550 at 1 kHz | 24200 | 79% |
| | 900° C. 5 h | 0329033 | | | |

There are several advantages of the disclosed precursor tape casting method compared to conventional tape casting methods. In conventional tape casting, ball milling is typically employed to form a homogeneous suspension. In precursor tape casting, milling is not required. Conventional tape casting employs casting materials which are prepared prior to casting. Precursor tape casting, on the other hand, employs casting materials which are precursors, i.e., starting materials. Thus, precursor tape casting combines materials synthesis and consolidation/annealing. The two methods also use different forms of the casting materials. In conventional tape casting, the starting materials are in the form of a slurry. In precursor tape casting, the precursors may be dispersed in a liquid medium to form a solution or a suspension. The precursors may also be in the form of a powder. Another difference between the two tape casting methods is in the additives. While conventional tape casting typically employs a dispersant to form a suspension, no dispersant is required for precursor tape casting. Another important difference is that conveninvention, but that the invention will include all embodiments falling within the scope of the appended claims.

What is claimed is:

1. A method of tape casting a material, comprising:
drying a first mixture comprising one or more chemical precursors and a liquid medium at a temperature effective to form agglomerates;
grinding the agglomerates to form a precomposite powder comprising the one or more chemical precursors;
combining the precomposite powder with a binder to form a second mixture;
casting the second mixture to form a green tape; and
heating the green tape for a time and at a temperature sufficient to convert the chemical precursors to their final chemical phase, and to anneal and form the material wherein the material comprises a composite selected from the group consisting of Fe—Ni/Silica, Co/Silica, Fe/Silica, Ni-Ferrite, Fe—Co/Silica, Fe—Co and $(FeCo)_{1-x}(Al_2O_3)_x$ where x is greater than zero and less than or equal to about 0.50.

2. The method of claim 1, wherein the heating is performed at a temperature less than a sintering temperature of the material.

3. The method of claim 1, further comprising shaping the green tape prior to heating.

4. The method of claim 1, further comprising laminating two or more green tapes prior to heating.

5. The method of claim 1, wherein the one or more chemical precursors comprises an inorganic salt, and the precursor inorganic salt is a carboxylate salt, an acetate salt, a nitrate salt, a chloride salt, an alkoxide salt, a butoxide salt, or combination comprising at least one of the foregoing salts.

6. The method of claim 1, wherein the one or more chemical precursors comprises an inorganic silane.

7. The method of claim 5, wherein the precursor inorganic salt is nickel nitrate, iron nitrate, cobalt acetate, or a combination comprising at least one of the foregoing salts.

8. The method of claim 1, wherein the second mixture further comprises a liquid medium, a modifier, or a combination comprising at least one of the foregoing salts.

9. The method of claim 1, wherein heating is performed at a temperature of about 300° C. to about 900° C.

10. The method of claim 1, wherein the final material comprises particles having grain sizes of about 1 nanometer to about 100 nanometers.

11. The method of claim 1, wherein the final material is a metal, a ceramic material, a ceramic/ceramic composite, a ceramic/metal composite, a metal/metal composite, or an organic/inorganic hybrid material.

12. A method of forming a magnetic composite tape, comprising:
tape casting a magnetic component chemical precursor and an insulating material chemical precursor using a scraping blade to form a green tape; and
heating the green tape for a time and at a temperature sufficient to simultaneously convert the magnetic component chemical precursor and the insulating material chemical precursor to their final chemical phase and to anneal the green tape, thereby forming a magnetic composite tape comprising magnetic particles embedded in an insulating material such that each magnetic particle is surrounded by the insulating material, wherein each magnetic particle has a grain size of about 1 nanometer to about 100 nanometers.

13. The method of claim 12, wherein heating is performed at a temperature less than a sintering temperature of the magnetic composite.

14. The method of claim 12, wherein the magnetic particles comprise a magnetic component selected from the group consisting of transition metals, Fe, Co, Ni, Mn, transition metal intermetallic alloys, Fe—Ni, Fe—Co, Co—Ni, Fe—B, Fe—N, Fe—Zr, Fe—Si, Fe—Si—B, Fe—Zr—B, Fe—P—B, Mn—Zn, Ni—Zn, transition metal-rare earth alloys, Fe—Nb, Fe—Sm, or a combination comprising at least one of the foregoing.

15. The method of claim 12, wherein the insulating material is a ceramic, a polymer, a ferrite, or a combination comprising at least one of the foregoing insulating components.

16. The method of claim 12, wherein the magnetic particles of the magnetic composite are separated by about 0.5 nanometers to about 100 nanometers.

17. A method of tape casting a material, comprising:
drying a first mixture comprising one or more chemical precursors and a liquid medium at a temperature effective to form agglomerates; the chemical precursors being selected from the group consisting of carboxylate salts, acetate salts, nitrate salts, chloride salts, alkoxide salts, butoxide salts, alkali elements, alkaline earth metals, transition metals, rare earth metals, combinations comprising one or more of the foregoing elements and metals, and combinations of the foregoing salts, elements and metals; the liquid medium being selected from the group consisting of water, alcohols, acetone, methyl ethyl ketones and a combination of one or more of the foregoing liquid medium;
grinding the agglomerates to form a precomposite powder comprising the one or more chemical precursors;
combining the precomposite powder with a binder to form a second mixture;
casting the second mixture to form a green tape; and
heating the green tape for a time and at a temperature sufficient to convert the chemical precursors to their final chemical phase, and to anneal and form the material wherein the material comprises a composite selected from the group consisting of Fe—Ni/Silica, Co/Silica, Fe/Silica, Ni-Ferrite, Fe—Co/Silica, Fe—Co and $(FeCo)_{1-x}(Al_2O_3)$ where x is greater than zero and less than or equal to about 0.50.

18. The method of claim 17, wherein the heating is performed at a temperature less than a sintering temperature of the material.

19. The method of claim 17, further comprising shaping the green tape prior to heating.

20. The method of claim 17, further comprising laminating two or more green tapes prior to heating.

* * * * *